United States Patent
Zhai et al.

(10) Patent No.: US 8,346,009 B2
(45) Date of Patent: Jan. 1, 2013

(54) AUTOMATIC EXPOSURE ESTIMATION FOR HDR IMAGES BASED ON IMAGE STATISTICS

(75) Inventors: Jiefu Zhai, Princeton, NJ (US); Joan Llach, Princeton, NJ (US); Zhe Wang, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 389 days.

(21) Appl. No.: 12/803,370

(22) Filed: Jun. 25, 2010

(65) Prior Publication Data
US 2010/0329554 A1    Dec. 30, 2010

Related U.S. Application Data

(60) Provisional application No. 61/269,758, filed on Jun. 29, 2009.

(51) Int. Cl.
*G06K 9/36* (2006.01)
(52) U.S. Cl. ........................ 382/274
(58) Field of Classification Search .......... 382/164, 382/167, 171, 173, 274, 284; 348/362–364
See application file for complete search history.

(56) References Cited

U.S. PATENT DOCUMENTS

| | | | |
|---|---|---|---|
| 5,805,721 A | 9/1998 | Vuylsteke et al. | |
| 6,359,617 B1 | 3/2002 | Xiong | |
| 6,593,970 B1 * | 7/2003 | Serizawa et al. | 348/362 |
| 6,839,462 B1 | 1/2005 | Kitney et al. | |
| 7,010,174 B2 * | 3/2006 | Kang et al. | 382/274 |
| 7,471,826 B1 | 12/2008 | Navon et al. | |
| 7,636,496 B2 | 12/2009 | Duan et al. | |
| 7,821,570 B2 | 10/2010 | Gallagher et al. | |
| 8,081,208 B2 | 12/2011 | Inomata et al. | |
| 2005/0117799 A1 | 6/2005 | Fuh et al. | |
| 2006/0262363 A1 | 11/2006 | Henley | |

FOREIGN PATENT DOCUMENTS

EP    1758058    2/2007

OTHER PUBLICATIONS

Krawczyk et al., "Lightness Perception in Tone Reproduction for High Dynamic Range Images", Eurographics 2005, vol. 24, No. 3, 2005.

(Continued)

*Primary Examiner* — Duy M Dang
(74) *Attorney, Agent, or Firm* — Robert D. Schedd; Harvey D. Fried; Richard LaPeruta

(57) ABSTRACT

A method for tone mapping high dynamic range images for display on low dynamic range displays wherein high dynamic range images are first accessed. The high dynamic range images are divided the into different regions such that each region is represented by a matrix, where each element of the matrix is a weight or probability of a pixel value. An exposure of each region is determined or calculated by estimating an anchor point in each region such that most pixels in each region are mapped to mid grey and the anchor points are adjusted to a key of the images to preserve overall brightness. The regions are then placed or mapped to zones and exposure values are applied to the regions responsive to the weight or probability. The regions are fused together to obtain a final tone mapped image.

14 Claims, 1 Drawing Sheet

OTHER PUBLICATIONS

Agarwala et al., "Interactive Digital Photomontage," The ACM SIGGRAPH 2004 Conference Proceedings, 9 pages.

Burt et al., "Enhanced Image Capture Through Fusion," IEEE 1993, David Sarnoff Research Center, Princeton, NJ, pp. 173-182.

Burt et al., "The Laplacian Pyramid as a Compact Image Code," IEEE Transactions on Communications, vol. COM-31, No. 4, Apr. 1983, pp. 532-540.

Chiu et al., "Spatially Nonuniform Scaling Functions for High Contrast Images," Proceedings from Graphics Interface '93, pp. 245-253, Toronto, May 1993.

Reinhard et al., "Dynamic Range Reduction Inspired by Photoreceptor Physiology," IEEE Transactions on Visualization and Computer Graphics, vol. 11, No. 1, Jan./Feb. 2005.

Dippel et al., Multiscale Contrast Enhancement for Radiographies: Laplacian Pyramid Versus Fast Wavelet Transform, IEEE Transactions on Medical Imaging, vol. 21, No. 4, Apr. 2002.

Drago et al., "Adaptive Logarithmic Mapping for Displaying High Contrast Scenes," Computer Graphics Forum, vol. 22(3), 9 pages, The Eurographics Assoc. and Blackwell Publishers 2003.

Durand et al., "Fast Bilateral Filtering for the Display of High-Dynamic-Range images," ACM Transactions on Graphics, 21(3): 257-266, 2002.

Fairchild et al., "The ICAM Framework for Image Appearance, Image Differences, and Image Quality," Journal of Electronic Imaging, 13: 126-138, 2004, 34 pages.

Fattal et al., "Gradient Domain High Dynamic Range Compression," ACM Transactions on Graphics, 21(3): pp. 249-256, 2002.

Krawczyk et al., "Computational Model of Lightness Perception in High Dynamic Range Imaging", Human Vision and Electronic Imaging XI, Proc. of SPIE-IS&T Electronic Imaging, SPIE vol. 6057, 2006.

Lischinski et al., "Interactive Local Adjustment of Tonal Values," Copyright 2006 by the Association for Computing Machinery, Inc., pp. 646-653.

Mertens et al., "Exposure Fusion," Pacific Graphics 2007, 9 pages.

Reinhard et al., "Photographic Tone Recuction for Digital Images", Asasociation for Computing Machinery, Inc. 2002.

Seetzen et al., "High Dynamic Range Display Systems," ACM SIGGRAPH Conference Proceedings, ACM Press, Aug. 9, 2004, pp. 1-9.

Toet, "Adaptive Multi-Scale Contrast Enhancement Through Non-Linear Pyramid Recombination", Pattern Recognition Letters, No. 11, Amsterdam,NL, pp. 735-742.

Vuylsteke et al., Multiscale Image Contrast Amplification (MUSICATM), SPIV, vol. 2167, Image Processing, 1994.

Wikipedia, "Pyramid (Image processing)," http://en.wikipedia.org/wiki/Pyramid_(image_processing), 2 pages.

Yee et al., "Segmentation and Adaptive Assimilation for Detail-Preserving Display of High-Dynamic Range Images", The Visual Computer, 2003.

* cited by examiner

AUTOMATIC EXPOSURE ESTIMATION FOR HDR IMAGES BASED ON IMAGE STATISTICS

CROSS REFERENCE TO RELATED APPLICATIONS

This application claims the benefit of U.S. Provisional Application Ser. No. 61/269,758 filed Jun. 29, 2009, which is incorporated by reference herein in its entirety.

CROSS-REFERENCE TO RELATED APPLICATIONS

This application relates to U.S. applications 13/376920 filed on Jun. 28, 2010 which published as 2012-0082397-Al; 13/381224 filed on Jun. 29, 2010 which published as 2012-0113130-Al; and 12/803,371 filed on Jun. 25, 2010 which published as 2010-0329557-Al.

FIELD OF THE INVENTION

The invention relates to the tone reproduction of high dynamic range (HDR) content on low dynamic range (LDR) displays, which is also known as the tone mapping problem. In particular, this invention includes a method to estimate the exposure of one or more regions of an HDR image. The method adjusts the exposure parameters of each region such that the overall look of the HDR image is maintained after tone mapping.

BACKGROUND OF THE INVENTION

In most applications, the tone mapping process must usually meet two requirements: keep image details, e.g. local contrast and maintain the appearance of relative brightness. Known work on tone mapping focuses on the first requirement and simply neglects the second one, which is usually the most important from the artists' perspective.

High dynamic range (HDR) has received much attention in recent years as an alternative format for digital imaging. The traditional Low Dynamic Range (LDR) image format was designed for displays compliant with ITU-R Recommendation BT 709 (a.k.a. Rec. 709), where only two orders of magnitude of dynamic range can be achieved. Real world scenes, however, have a much higher dynamic range, around ten orders of magnitude in daytime, and the human visual system (HVS) is capable of perceiving 5 orders of magnitude at the same time. Traditional photography has used region-based exposure adjustment for many years, and it continues being used today with digital images. The process, however, is manual and very time consuming.

There are many tone mapping algorithms available in the literature. The best methods (local tone mapping methods) try to adapt the parameters of the tone mapping to local characteristics of the image. Some methods determine the mapping parameters based on the characteristics of a neighborhood around each pixel (e.g. F. Drago, K. Myszkowski, T. Armen, and N. Chiba. "Adaptive Logarithmic Mapping for Displaying High Contrast Scenes," Computer Graphics Forum, 22(3), 2003; Reinhard, E., Stark, M., Shirley, P., and Ferwerda J. "Photographic tone reproduction for digital images", ACM Trans. Graph. 21, 3 (July), 267-276; F. Durand and J. Dorsey. "Fast Bilateral Filtering for the Display of High-dynamic-range Images," ACM Transactions on Graphics, 21(3):257-266, 2002), and others operate on a transformed domain (e.g. R. Fattal, D. Lischinski, and M. Werman. "Gradient Domain High Dynamic Range Compression," ACM Transactions on Graphics, 21(3):249-256, 2002), which operates on the image gradient), but since none of these methods process the image in regions, they do not allow independently controlling the exposure of different areas of the image.

One method process the image in regions, using several LDR images of the same scene (each generated with a different exposure) as input to the tone mapping process. However, it does not implement any sort of exposure correction.

Tone mapping is not only studied by image processing researchers, but also by painters as well as film photographers. They face the same problem of using a limited dynamic range media (i.e. canvas for painters and print paper for photographers) to represent the high dynamic range scenes. Here we review the "Zone System", which is a photographic technique formulated by Ansel Adams and Fred Archer (Adams, A. "The Negative", The Ansel Adams Photography series. Little, Brown and Company. 1981; Adams, A. "The Print", The Ansel Adams Photography series. Little, Brown and Company. 1981). As shown in FIG. 1, the Zone System assigns numbers from 0 through 10 to different perceptual brightness, with 0 representing black, 5 middle gray, and 10 pure white. These values are known as zones. In the theory of the Zone System, a photographer first identifies the key elements in the scene and places these elements on the desired zones.

This process relies on the perception of the scene rather than on the measurement of the radiance. Then a light meter is used to measure the radiance for each key element in the scene. As there can be only a single exposure value per shot, an exposure value is chosen such that the most important element is mapped to the desired zone. As a result, other (also important) elements may be mapped to the "wrong" zone, becoming either too dark or too bright. Afterwards, in the printing process, this problem is fixed by applying a "dodge and burn" operation, which is a printing technique where some light is withheld from a portion of the print during development (dodge), or more light is added to that region (burn). Therefore, a key element that is mapped to a lower zone than the desired one will be exposed in the light longer than the rest part of the picture. Similarly, the key element that is mapped to a higher zone than the desired one will be exposed less. This local processing will guarantee that the key elements of the picture are mapped to the desired zone in the final output. In other words, the perceptual brightness of these key elements remains consistent with how they look like in real life.

SUMMARY OF THE INVENTION

A method for tone mapping high dynamic range images for display on low dynamic range displays wherein high dynamic range images are first accessed. The high dynamic range images are divided into different regions such that each region is represented by a matrix, where each element of the matrix is a weight or probability of a pixel value. An exposure of each region is determined or calculated by estimating an anchor point in each region such that most pixels in each region are mapped to mid grey and the anchor points are adjusted to a key of the images to preserve overall brightness. The regions are then placed or mapped to zones and exposure values are applied to the regions responsive to the weight or probability. The regions are fused together to obtain a final tone mapped image. A means is provided for user interaction such that mapping between regions and zone is performed responsive to user interaction. The method can further comprise any of the following steps of identifying or establishing different perceptual brightness levels for the high dynamic range images; identifying or establishing different perceptual brightness levels for the final tone mapped image; determining regions responsive to luminance data; toning mapping based on total luminance; and tone mapping is performed based on individual colors.

BRIEF DESCRIPTION OF THE DRAWINGS

The invention will now be described by way of example with reference to the accompanying figures of which.

DETAILED DESCRIPTION OF THE EMBODIMENTS

Figures 1, 2:
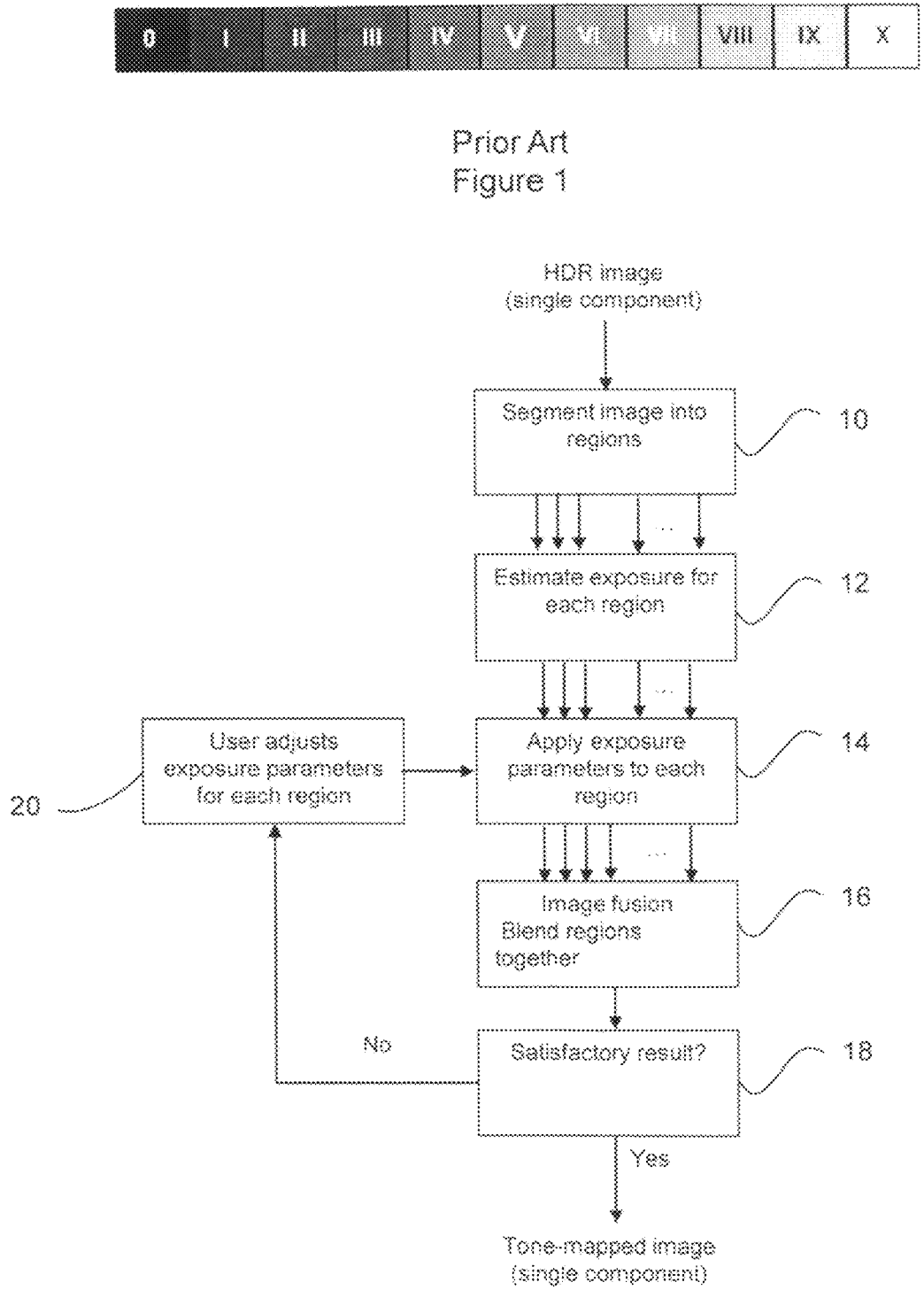
FIG. 1 shows a know zone system perceptual brightness scale.
FIG. 2 is a flow diagram of a zone based tone mapping method according to the invention.

The invention will now be described in more detail wherein a method adjusts the exposure of each region based on the overall brightness level of the original HDR image.

In order to display an HDR image on a LDR display device, a tone mapping method must be employed to map the HDR image, which is usually available as radiance, to 8bit RGB index numbers. The tone mapping process is not straight forward because it has to simulate the process that happens in the HVS so that the tone mapped LDR image can deceive the HVS into believing it is close enough to the original HDR image. This requires the tone mapping algorithm to be able to maintain both the local contrast and the perceptual brightness.

The invention provides a method to estimate the exposure of regions of an HDR image to maintain the perceptual brightness. It is especially suited to region-based tone mapping algorithms.

The method according to the invention includes a zone-based tone mapping framework which divides the image into regions and then estimates the exposure of each region. The estimation of the exposure, however, maximizes the use of the dynamic range on the tone mapped image, without special consideration to the overall look (brightness) of the tone mapped image compared to the original HDR image.

This approach can be used with digital images, but, there is no known method that automatically adjusts the exposure of an image for one or more regions.

A method according to the invention automatically estimates the proper exposure of one or more regions of an HDR image maintaining the perceptual brightness of the image.

Given an HDR image I in a known color space, the user first defines the luminance image. If the HDR data is in XYZ color space, the Y component can be used as luminance image. If the HDR data uses the same primary colors as Rec. 709, the conversion from RGB color space can be done as follows:

$$L(i,j) = 0.2126 * R(i,j) + 0.7152 * G(i,j) + 0.0722 * B(i,j)$$

Other conversions between RGB (or other color spaces) and the luminance image may be used depending on the format of the input picture.

The user can define the average, minimum and maximum luminance as follows:

$$L_{avg} = e^{\frac{1}{N} \Sigma_{i,j} ln(L(i,j))}$$

$$L_{max} = \max_{R_{max}}(L)$$

$$L_{min} = \min_{R_{min}}(L)$$

where Rmin and Rmax are two predefined percentages, maxR(X) is the smallest value in X larger or equal than R percent of the values in X, and minR(X) is the largest value in X smaller or equal than R percent of the values in X. Typically Rmin=Rmax=99%.

Next, the user defines the simplest form of tone mapping: single exposure. Single exposure tone mapping scales HDR radiance data by a constant, mapping all image values to the range [0, 1]. In single exposure, the user needs to specify one anchor point: a pixel will saturate and be mapped to 1 if the luminance of that pixel exceeds that of the anchor point; otherwise, it will be mapped to a value between 0 and 1. Therefore, single exposure can be formulated as:

$$I(i,j) = S\left(\frac{L(i,j)}{A}\right)$$

where A is the anchor point and S(x) can be defined as:

$$S(x) = \begin{cases} 1 & x > 1 \\ x^{1/\gamma} & \text{otherwise} \end{cases}$$

where γ typically takes values in the range [2.2, 2.4] and represents the gamma of the output device (where the tone mapped image will be shown).

Intuitively, estimating the exposure of a region is equivalent to deciding to which zone the region should be mapped to. In other words, a good anchor point will result in a properly exposed region after single exposure mapping.

Deciding to which zone each region should be mapped to is a very subjective task because it depends on the visual adaptation of the HVS. In the traditional zone system, mapping key elements to zones is decided visually (and subjectively) by the photographer.

In this embodiment of the invention, the estimation of the exposure comprises two steps. The first step estimates an initial anchor point for each region, which maps most pixels in each region to mid grey. The second step adjusts the anchor points according to the key of the image in order to preserve the overall brightness of the HDR scene after the mapping.

In the first step, for a given region, the anchor point is chosen so that most of the pixels in the given region are mapped to mid gray.

Note that one or more regions can be used per image. In general, the more regions are used, the lower the dynamic range on each one and therefore the better the anchor points. The invention is generic and can handle any number of regions (from a single region covering the entire image to several smaller regions) and supports different region sizes and also overlapping and non-overlapping regions (fuzzy or hard segmentation).

For some HDR image segmentation methods, the segmentation process is done using anchor points. In that case, the initial anchor point estimation simply takes the same ones used for the segmentation.

In a general scenario, however, the user cannot make any assumptions about how the image has been segmented. All the available information is the number of regions, N, and the segmentation itself, which can be represented as image weights, $W_n$. The value $W_n(i,j)$ is the weight (probability) in the range [0,1] that the pixel at location (i,j) belongs to region n.

In a first method denoted here as image average, for the single-region case, where n=1 and all the pixels have the same weight, $W_n(i,j)=1$, for all $(i,j)$, the anchor point can be computed as follows:

$$A = 2^{\frac{1}{WH}(\Sigma_{i,j} \log_2 L(i,j))} \quad (1)$$

where H and W are the height and width in pixels of the image, respectively.

In a second alternate method denoted as optimization-based method, the anchor point can be obtained by maximizing the following object function:

$$J = \sum_{i,j} e^{-\frac{\left(s\left(\frac{L(i,j)}{A}\right)-0.5\right)^2}{\sigma^2}} \quad (2)$$

The optimization of J can be done in different ways, for instance using the iterative gradient descent method.

In the multi-region case, the above equations can be generalized for the multi-region case as follows. Equation 1 becomes:

$$A_n = 2^{\frac{1}{\Sigma_{i,j} w_n(i,j)}(\Sigma_{i,j} W_n(i,j) \log_2 L(i,j))} \quad n=\{1,\ldots,N\} \quad (3)$$

and equation 2 becomes:

$$J_n = \sum_{i,j} W_n(i,j) e^{-\frac{\left(s\left(\frac{L(i,j)}{A}\right)-0.5\right)^2}{\sigma^2}} \quad n=\{1,\ldots,N\} \quad (4)$$

For the multi-region case, equation (4) can be independently solved for each region, n.

The first step provides a baseline for the adjustment step. Mapping each region to mid-grey will sometimes result in a flat looking image in tone mapping. In this second step, the user automatically refine the value of the anchor point of each region such that the overall brightness of tone mapped image better approximates the real HDR scene. The adjusted anchor points $A_n'$ are derived from the baseline values as follows:

$$A_n' = 2^{\lambda_n} A_n, \ n=\{1,\ldots,N\}$$

where $\lambda_n$, the variable that needs to be estimated, controls the adjustment of the anchor points.

The main idea is to scale the exposure of each region based on the key of the image.

The user first computes h, defined as follows:

$$h = \frac{(\log_2 L_{avg} - \log_2 L_{min}) - (\log_2 L_{max} - \log_2 L_{avg})}{\log_2 L_{max} - \log_2 L_{min}}$$

If Lavg=Lmin=Lmax, then h equals 0.

The parameter h measures whether the average image luminance is closer to the minimum or the maximum luminance in the image, which indicates the key of the HDR image. The closer the average luminance is to the minimum, the smaller h is and the lower the key of the HDR image; the closer the average luminance is to the maximum, the larger h is and the higher the key of the HDR image. For low key images, i.e. h in $(-1,0]$, the darkest regions (shadows) should be given less exposure, i.e. larger anchor points. For high key images, i.e. h in $[0, 1)$, the brightest regions (highlights) should be given more exposure, i.e. smaller anchor points. This can be achieved by changing $\lambda_n$ with a monotonic decreasing function of n.

For the single-region case, $\lambda=\lambda_1$ is computed as follows:

$$\lambda = -4h$$

For the multi-region case ($N \geq 2$), $\lambda_n$ is computed as follows:

$$\lambda_n = \begin{cases} -4h\left(1 - \frac{(n-1)^\rho}{(N-1)^\rho}\right) & h < 0 \\ -4h\left(1 - \frac{|n-N|^\rho}{(N-1)^\rho}\right) & h \geq 0 \end{cases} \quad (8)$$

where $\rho$ usually takes values between 1 and 8.

The proposed exposure estimation method can be used in the region-based tone mapping algorithm described next. As illustrated in FIG. 2, a description of the main steps follows. The input high dynamic range (HDR) image is first divided into different regions at step 10. It can be a hard segmentation or a fuzzy one. In either case, each region can be represented by a matrix, where each element of the matrix is the probability (weight) of a pixel. If a hard segmentation is used, image pixels belong to a single region and therefore the probability is either 0 or 1. If a fuzzy segmentation is used, each pixel can spread over several (even all) regions, and therefore the probability can take any value between 0 and 1.

Then, at step 12, the algorithm decides to which zone each region will be mapped. This essentially estimates the exposure for each region according to the methods and embodiments described above. The mapping between region and zone can also be done with user interaction.

Next, at step 14, each region is exposed with its own exposure parameters as described above.

Afterwards, at step 16, a fusion or blending process is employed to generate the final tone mapped image by fusing the different regions together (each exposed with its own exposure value) using the weights obtained above.

Optionally, at steps 18 and 20, the user can check the look of the tone mapped image and make changes to the exposure value of one or more regions and then repeat steps 14-18 until the result is satisfactory.

The foregoing illustrates some of the possibilities for practicing the invention. Many other embodiments are possible within the scope and spirit of the invention. For example, other monotonic increasing functions instead of the one described above may be used or the base of the logarithm function may be other than base 2. It is, therefore, intended that the foregoing description be regarded as illustrative rather than limiting, and that the scope of the invention is given by the appended claims together with their full range of equivalents.

What is claimed is:

1. A method for tone mapping high dynamic range images for display on low dynamic range displays comprising the steps of:
   accessing high dynamic range images;
   dividing the high dynamic range images into different regions such that each region is represented by a matrix, where each element of the matrix is a weight or probability of a pixel value;

determining or calculating exposure of each region by estimating an anchor point in each region;

applying exposure values to the regions responsive to the weight or probability; and fusing the different regions together to obtain a final tone mapped image.

2. The method of claim 1 wherein most pixels in each region are mapped to mid grey and the anchor points are adjusted to a key of the images to preserve overall brightness.

3. The method of claim 2, further comprising the step of identifying or establishing different perceptual brightness levels for the high dynamic range images.

4. The method of claim 2, further comprising the step of identifying or establishing different perceptual brightness levels for the final tone mapped image.

5. The method of claim 1, further comprising the step of determining regions responsive to luminance data.

6. The method of claim 1, wherein toning mapping is performed based on total luminance.

7. The method of claim 1, wherein tone mapping is performed based on individual colors.

8. A method for tone mapping high dynamic range images for display on low dynamic range displays comprising the steps of:

accessing high dynamic range images;

dividing the high dynamic range images into different regions such that each region is represented by a matrix, where each element of the matrix is a weight or probability of a pixel value;

determining or calculating exposure of each region by estimating an anchor point in each region;

applying exposure values to the regions responsive to the weight or probability;

fusing the different regions together to obtain a final tone mapped image; and providing a means for user interaction such that mapping between regions and zone is performed responsive to user interaction.

9. The method of claim 8 wherein most pixels in each region are mapped to mid grey and the anchor points are adjusted to a key of the images to preserve overall brightness.

10. The method of claim 9, further comprising the step of identifying or establishing different perceptual brightness levels for the high dynamic range images.

11. The method of claim 9, further comprising the step of identifying or establishing different perceptual brightness levels for the final tone mapped image.

12. The method of claim 8, further comprising the step of determining regions responsive to luminance data.

13. The method of claim 8, wherein toning mapping is performed based on total luminance.

14. The method of claim 8, wherein tone mapping is performed based on individual colors.

* * * * *